Patented June 9, 1931

1,808,865

UNITED STATES PATENT OFFICE

ARLIE WILLIAM SCHORGER, OF MADISON, WISCONSIN, ASSIGNOR TO C. F. BURGESS LABORATORIES INC., OF MADISON, WISCONSIN, A CORPORATION OF DELAWARE

INTERIOR WALL FINISH

No Drawing.  Application filed March 31, 1927.  Serial No. 180,072.

The present invention relates generally to wall finishes, and in particular to a dry mix suitable for the addition of water to prepare it for use.

The object of my invention is the production of a surfacing material or wall finish for interior walls and especially wall boards for the purpose of providing an ornamental, attractive and economical coating and finish. A further object of the invention is to produce a wall finish which is water-proof and non-absorbent of moisture and has calcium sulphate, such as plaster of Paris, as the principal ingredient.

A further object is to produce a wall finish which has calcium sulphate, such as plaster of Paris, as the principal ingredient and which will adhere to wall surfaces with great tenacity, will be hard without being brittle, and will not be subject to objectionable checking.

My composition consists of a mixture of calcium sulphate, preferably plaster of Paris, with smaller amounts of other neutral fillers, such as ground mica and fine asbestos, together with hydrated lime and casein. Among other forms of calcium sulphate suitable for my wall finish are ground gypsum, ground anhydrite, precipitated calcium sulphate and ground dead burned gypsum.

Although plaster of Paris has been used extensively as a substitute for lime in ordinary plaster, it has not been used in a composition such as is contemplated by my invention. My composition successfully uses plaster of Paris in making a spreadable wall finish which is mixed dry and to which cold water is added immediately preceding its use. The fluid suspension is usually applied to the wall or other surface by means of a brush.

Calcium sulphate in its various forms is a relatively inexpensive body material which has a high degree of plasticity that makes it especially desirable as a wall finish. Plaster of Paris is distinguished from other forms of calcium sulphate by its property of taking up water rapidly and thereby forming crystals containing such water, as water-of-crystallization. Anhydrite does not exhibit this property. Dead burned gypsum takes water up slowly, and the gypsum itself consists of such crystals already formed. Accordingly, when I use plaster of Paris as the calcium sulphate of my composition, the crystal formation in the applied coating effects an interlocking of the particles with each other, with other constituents, and with the surface to which it is applied. The interlocking action strengthens the coating, gives greater adherent powers, and otherwise improves the physical qualities. For example, it provides a smoother finish. The foregoing refers to the advantageous features of plaster of Paris in my composition as distinguished from ordinary set plaster of Paris. Without other ingredients which I employ, set plaster of Paris absorbs water readily, is friable and adheres poorly to certain walls or other surfaces. In my composition its adherence and resistance to water are improved by adding hydrated lime and casein, the latter being preferably ground to 80 to 100 mesh. It is not necessary in my improved composition to add a solvent, such as borax or ammonia, for the casein, as is usually done.

I have further discovered that finely ground asbestos when added to plaster of Paris or other forms of calcium sulphate generally increases the toughness and resistance to shock and decreases checking appreciably. The finely ground asbestos is preferably in the form of "floats" from asbestos refining operations, or the "short fibered" asbestos found in nature. Long fibered asbestos makes the composition "ball" when mixed with water. Finely ground mica also increases the toughness and workability and I add a limited amount in addition to the fine asbestos. The mica preferably is that known to the trade as No. 100 grade, a screen analysis of which shows about 65% passing through a 100 mesh screen and practically all passing through a 50 mesh screen. Other neutral fillers, in addition to asbestos and mica, may be used, if desired, together with coloring pigments.

I prefer a dry composition which contains from 40 to 60 parts by weight of plaster of Paris or other ground calcium sulphate, 15 to 35 parts of ground mica, 10 to 15 parts of fine asbestos, 8 to 10 parts of powdered casein, and 5 to 7 parts of hydrated lime. My preferred composition contains 50 parts by weight of plaster of Paris or other ground calcium sulphate, 25 parts of ground mica, 10 parts of fine asbestos, 10 parts of powdered casein and 5 parts of hydrated lime.

Previous to use, one pound of dry powder is mixed with 1 to 1.25 pounds of water. The resulting mixture flows smoothly and uniformly when applied with a brush, and 20 to 30 minutes after application, raised or stippled effects can be obtained easily by any of those methods well known by those skilled in the art.

My composition adheres with great tenacity to wall-paper, wall-board, or plastered surfaces in either new or repair work. It is hard without being brittle, so that it does not crack readily when struck a sharp blow with a hard object. Furthermore, there is no objectionable checking during the drying of the high portions produced by stippling.

I claim:

1. A composition for interior wall finish comprising 40 to 60 parts of ground calcium sulphate, 15 to 35 parts of ground mica, 10 to 15 parts of fine asbestos, 8 to 10 parts of ground casein, 5 to 7 parts of hydrated lime.

2. A composition for interior wall finish comprising 50 parts of plaster of Paris, 25 parts of ground mica, 10 parts of fine asbestos, 10 parts of ground casein, 5 parts of hydrated lime.

In testimony whereof, I have subscribed my name.

ARLIE WILLIAM SCHORGER.